United States Patent [19]
Hansen et al.

[11] Patent Number: 5,391,256
[45] Date of Patent: Feb. 21, 1995

[54] HOLLOW AIRFOIL CAVITY SURFACE TEXTURE ENHANCEMENT

[75] Inventors: Kurt L. Hansen; Johnny F. Hill, II, both of Cincinnati; Arthur L. Ludwig, Hamilton, all of Ohio

[73] Assignee: General Electric Company, Cincinnati, Ohio

[21] Appl. No.: 43,110

[22] Filed: Apr. 5, 1993

[51] Int. Cl.⁶ .......................... B44C 1/22; C23F 1/00
[52] U.S. Cl. .................. 156/630; 156/634; 156/645; 156/656; 134/22.1
[58] Field of Search ............ 156/630, 634, 645, 654, 156/656, 664; 134/22.1; 29/889.72

[56] References Cited

U.S. PATENT DOCUMENTS

| | | | |
|---|---|---|---|
| 3,043,362 | 7/1962 | Mennesson | 156/640 X |
| 3,148,088 | 9/1964 | Happer et al. | 156/641 X |
| 3,627,443 | 12/1971 | Pirzer | 416/97 |
| 3,653,110 | 4/1972 | King, Jr. et al. | 29/156.8 H |
| 3,825,984 | 7/1974 | Linko et al. | 29/156.8 H |
| 4,604,780 | 8/1986 | Metcalfe | 29/156.8 R |
| 4,642,863 | 2/1987 | Schulz | 29/156.8 B |
| 4,859,276 | 8/1989 | John et al. | 134/22.12 X |
| 5,063,662 | 11/1991 | Porter et al. | 29/889.72 |

FOREIGN PATENT DOCUMENTS

0448339A1  9/1991  European Pat. Off. .

*Primary Examiner*—William Powell
*Attorney, Agent, or Firm*—Jerome C. Squillaro; Bernard E. Shay

[57] ABSTRACT

A method and passage system is applicable to hollow structures, such as hollow rib core fan blades, for removing alpha case and contamination, for improving surface texture, and for smoothing diffusion bonded joints to reduce notches and flaws, after fabrication. The passage system allows for venting and full cavity access to permit cleaning of the interior of the hollow structure. The method of cleaning the interior of a hollow structure may comprise applying an etchant to strip the topical layer from the inside of a hollow mechanical structure, such as a hollow core airfoil; or may comprise pumping an abrasive flow through the hollow cavities of the structure.

1 Claim, 3 Drawing Sheets

HOLLOW AIRFOIL CAVITY SURFACE TEXTURE ENHANCEMENT

BACKGROUND OF THE INVENTION

The present invention relates to aircraft engine systems and, more particularly, to a use of a chemical solution or abrasive flow to strip the topical layer from the inside of a hollow mechanical structure such as a hollow core airfoil of a high bypass turbofan engine.

Modern high bypass turbofan engines incorporate wide chord fan blades for improved aerodynamic efficiency. To minimize system weight, fan blade airfoils and dovetails are made hollow either by material removal, or by fabricating hollow constructions by forming and joining one or more pieces into a final assembly. Titanium alloys are typically used in front-end turbomachinery static and rotating airfoils.

Since many of the manufacturing processes involve exposing the structure to elevated temperatures for long periods of time, the Titanium oxidizes, or forms an alpha case structure on exposed surfaces. The high temperatures from the thermal processes cause formation of the alpha case layer which is hard and brittle, and can thereby lead to failures. While this condition can readily be removed on the exterior of the component, interior cavities are not accessible to traditional material removal or surface enhancement methods. The alpha case, or embrittled material layer, is known to have negative effects on material properties, particularly on fatigue strength, an attribute critical to rotating blades.

The joining and forming techniques used to produce hollow parts also contribute to the creation of many localized flaws and defects inside the hollow parts which cannot be removed once the part is fabricated. These flaws act as stress raisers which can effectively reduce the fatigue strength of the component, and can result from mating surface misalignment or offsets, edge damage prior to bonding, poor stop-off definition, contamination, or tearing due to excessive forming rates. Such conditions are undesirable and detrimental to the integrity of the blade or vane. Furthermore, fatigue crack initiation and propagation is a major cause of failure in turbomachinery flow path hardware. Achieving the highest possible fatigue strength of each part, particularly of critical rotating hardware, is crucial to the overall reliability and integrity of the machine.

It is therefore highly desirable and an object of the present invention to produce a final part void of internal alpha case and surface defects which degrade the fatigue properties of the structure.

Another object of the present invention is the use of an etchant, acid, or abrasive slurry on the interior of a fabricated part to overcome the disadvantages of the prior art.

Another object of the present invention is to allow venting and full cavity access in the interior of a fabricated part to maximize the use of the etchant, acid, or abrasive slurry on the interior of the part.

Another object of the present invention is to recontour local, sharp discontinuities that occur at bond lines.

These objects and other features and advantages will become more readily apparent in the following description when taken in conjunction with the appended drawings.

SUMMARY OF THE INVENTION

The present invention has been developed to fulfill the needs noted above. The present invention applies etchants, acids, or abrasive slurries to hollow blades or vanes manufactured by super-plastic-forming and/or diffusion bonding to enhance the internal fatigue characteristics of the structure by material removal and/or contouring.

Briefly, in accordance with the present invention, a method and passage system is applicable to hollow structures, such as hollow rib core fan blades, for removing alpha case and contamination, for improving surface texture, and for smoothing diffusion bonded joints to reduce notches and flaws, after fabrication. The passage system allows for venting and full cavity access to permit cleaning of the interior of the hollow structure. The method of cleaning the interior of a hollow structure may comprise applying an etchant to strip the topical layer from the inside of a hollow mechanical structure, such as a hollow rib core airfoil. Alternatively, the method of cleaning the interior of a hollow structure may comprise introducing an abrasive flow through the hollow cavities of the structure.

In the drawings as hereinafter described, a preferred embodiment is depicted; however, various other modifications and alternative constructions can be made thereto without departing from the true spirit and scope of the invention. For example, the process can be applied to static and rotating airfoils, or to any hollow parts where small amounts of material removal are required on internal surfaces. The general concept can also be extended to other metals or materials.

DETAILED DESCRIPTION OF THE PREFERRED EMBODIMENTS

Figure 1:
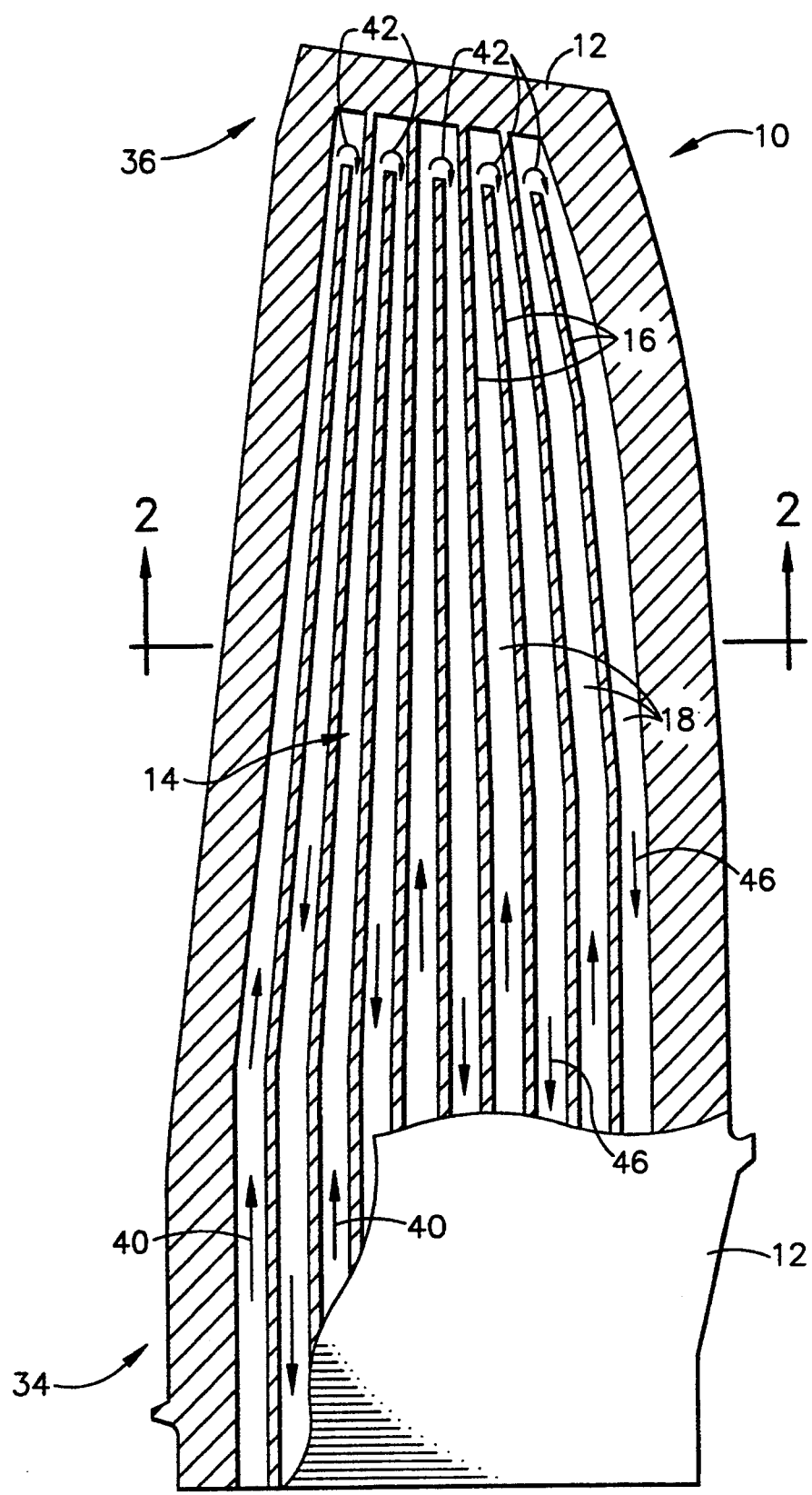
FIG. 1 is a representative fan blade to which the process of the present invention may be applied.

Referring now to the drawings, in FIG. 1 there is illustrated a representative fan blade 10 to which the concept of the present invention may be applied. The concept of the present invention involves using etchants, acids, liquid honing, or abrasive flows to remove residual surface contamination, or improve flaw profiles on internal surfaces of hollow pieces, particularly hollow aircraft blades and vanes, such as blade 10 of FIG. 1.

The fan blade 10 includes an airfoil 12 having a hollow core 14. For purposes of description only, the fan blade 10 of FIG. 1 is shown as a rib core fan blade having ribs 16. Obviously, the concept of the present invention will apply to any hollow structure, including a truss core fan blade or other hollow core airfoil.

The fan blade 10 of FIG. 1 is typically constructed by joining a plurality of pieces to form the single structure 10 having a hollow interior portion. The pieces may initially have slots machined therein to form cavities 18 within the hollow interior portion 14 upon joining of the pieces. The joining process may be any suitable joining process, such as diffusion bonding, wherein gas pressure or mechanical loading is applied to the outer surface of the joined pieces. The plurality of joined pieces may comprise two, such as for a rib core; three, such as for a truss core; or even four or more. The joined pieces are then superplastically formed to final shape. That is, the structure 10 is put in a hard die to re-inflate the slots or cavities, which may be depressed by the diffusion bonding. Unfortunately, the thermal processes for forming the structure 10 can cause formation of an alpha case layer. In addition, the joining and forming techniques used to produce hollow parts contribute to the creation of many localized flaws and defects inside the hollow parts, such as at bonding surfaces.

Figure 2:
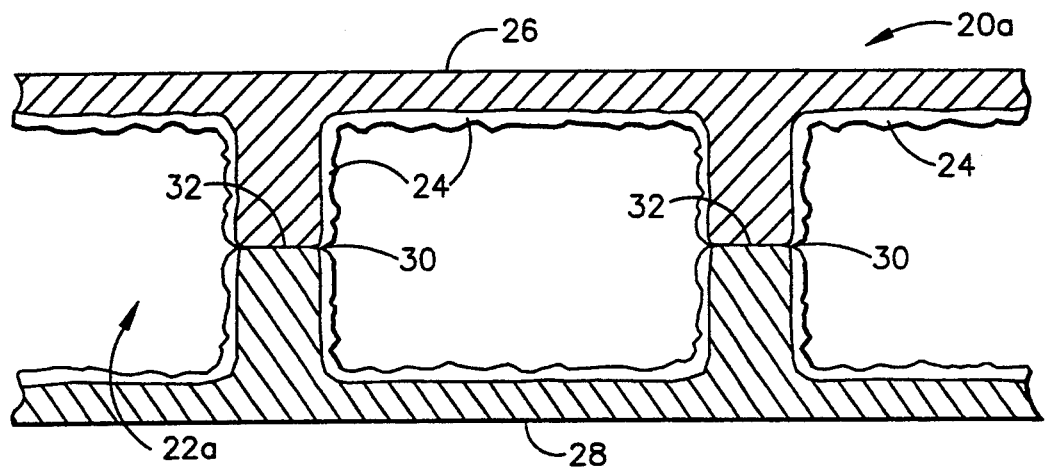
FIG. 2 is a cross-sectional view taken along line 2—2 of the fan blade of FIG. 1, illustrating alpha case and bonding defects present in the prior art.
Figure 3:
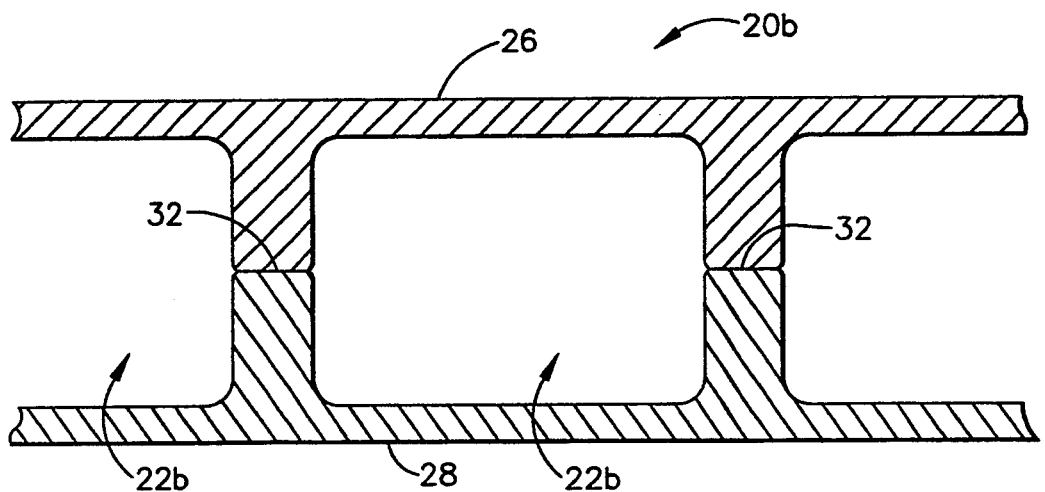
FIG. 3 is a cross-sectional view taken along line 2—2 of the fan blade of FIG. 1, illustrating elimination or correction of the defects of FIG. 2, after application of the process of the present invention.
Figure 9:
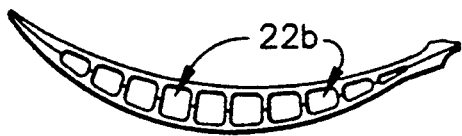
FIGS. 5-9 are sectional airfoil views taken along lines 5—5, 6—6, 7—7, 8—8, and 9—9 of the bottom end portion of the fan blade of FIG. 4, illustrating the transition from holes to cavities in the lower part of the blade of FIG. 1, introduced to allow access to each interior cavity.
Figure 8:
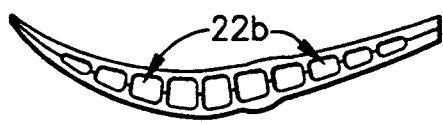
Figure 7:
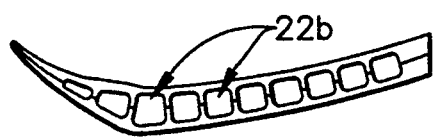
Figure 6:
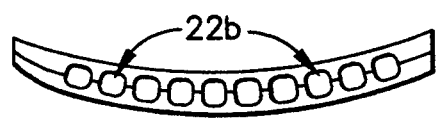

Referring now to FIGS. 2 and 3, and continuing with FIG. 1, sections 20a and 20b of FIGS. 2 and 3, respectively, taken along line 2—2 of FIG. 1, illustrate internal cavities 22a and 22b, respectively, of the formed fan blade 10. The internal cavity 22a of section 20a of FIG. 2 illustrates the alpha case and bonding defects inside the hollow parts, before the concept of the present invention is applied. As seen in FIG. 2, an alpha case layer 24 or other contamination has formed on the internal surface of cavity 22a. In addition, two pieces 26 and 28, which comprise the plurality of pieces joined to form the rib core fan blade 10 of FIG. 1, illustrate notches 30 which are a sharp defect at bonding surface 32.

The present invention eliminates these defects, as illustrated in FIG. 3, where the alpha case layer 24 is gone and the notches 30 are smoothed out at bonding surface 32. In one embodiment of the present invention, an acid or etchant agent is admitted into the cavities 18 of the fabricated part 10, once all joining and forming is complete. The etchant or acid displaces and removes the thin, relatively uniform alpha case layer 24 that may have formed on internal cavity surfaces. The etchant or acid agent also smooths out or recontours any sharp flaws at or near bond lines, such as notches 30, which act as stress raisers. The type of chemical, solution mixture, and exposure time depends on the material, construction and amount of material removal necessary to achieve the desired effects. In one embodiment, an electrical potential may be induced between the cleaning agent fluid and the part 10 to insure the rounding of sharp projections, such as notches 30, and accelerate the removal process of alpha case layer 24.

In an alternative embodiment of the present invention, an abrasive flow or slurry is pumped through the cavities 18 to remove the alpha case layer 24 and smooth out bond line flaws 30. This abrasive jet machining process requires that a relatively high fluid velocity be achieved in order to maximize the effectiveness of the process. In the abrasive flow or slurry process, material such as alpha case layer 24, is removed by fine abrasive particles, such as aluminum oxide or silicon carbide, which are carried in a high velocity stream of air, nitrogen, or carbon dioxide. A slurry in which the abrasive is carried in a liquid medium, called liquid honing, may also be used.

Figure 5:
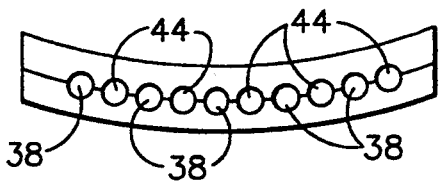
Figure 4:
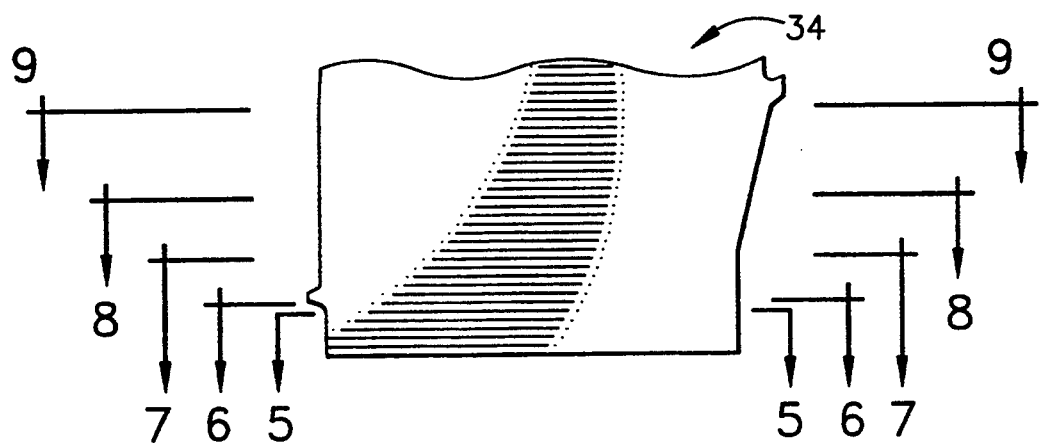
FIG. 4 is a bottom end portion of the representative fan blade illustrated in FIG. 1.

In order to achieve the internal cavity cleaning process, the present invention includes a passage means for allowing access to the interior of the hollow structure 10. The passage means comprises full cavity access at a bottom 34 of the structure 10, although the full cavity access may alternatively exist at the top of the structure. The full cavity access is illustrated in FIGS. 1 and 5. The passage means further comprises cross-cavity venting at the opposite end, here top end 36, to allow through-flow in the structure 10 for high speed slurry cleaning.

Referring now to FIGS. 4–9, the full cavity access feature permits the etchant or the abrasive flow to be introduced to entrance ports 38, best illustrated in FIG. 5, at the dovetail 34 of the structure 10. The entrance ports 38 comprise the full cavity access of the present invention. Once introduced to the cavities 18, the etchant or slurry can travel or flow upward in the direction of upward projecting arrows 40 in FIG. 1. The etchant or slurry then flows around each rib 16, as indicated by arrows 42 where the cross-cavity venting feature occurs, and expelled from the hollow interior 14 via discharge ports 44, in the direction of downward projecting arrows 46. The cleaning agent, which may be the etchant or the slurry, travels through each cavity to eliminate the alpha case and bond line defects caused by the fabrication of the structure 10. As illustrated in FIGS. 6–9, the entrance ports 38 and discharge ports 44 of FIG. 5, which exist at the very bottom end of dovetail 34 of the structure 10, begin to assume a squared cavity shape 22b of the rib core 20b, illustrated in FIG. 3, as the top end 36 of the structure 10 is approached. It should be noted, however, that the shape of the cavities may be any of a variety of shapes.

The present invention involves using a cleaning agent, such as an etchant or a slurry, to remove residual surface contamination and improve flaw profiles in internal surfaces of hollow structures. The present invention also addresses access for the cleaning agent into the hollow interior of the structure. For example, in a fan blade, access is provided through the bottom or dovetail of the part. As will be obvious to those skilled in the art, these access channels could be filled, once the cavity surface enhancement process is complete, using plugs or inserts. For the abrasive flow technique, which requires an entrance and a discharge port, a serpentine or u-shaped internal flow path can be incorporated, as illustrated and described above.

It is seen from the foregoing, that the objectives of the present invention are effectively attained, and, since certain changes may be made in the construction set forth, it is intended that matters of detail be taken as illustrative and not in a limiting sense.

What is claimed is:

1. A method of etching the interior of a hollow structure, the method comprising the steps of:
   diffusion bonding a plurality of pieces to form a single structure having a hollow interior portion including a plurality of passages accessible through openings at a first end of said structure wherein said openings are substantially equal in size and shape to said passages and alternate adjoining ones of said passages are connected by an opening at an end thereof opposite said first end;
   superplastically forming the plurality of pieces; and
   introducing an etchant to a cavity section between the plurality of pieces to etch away contaminants and surface irregularities from the interior surface of the structure.

* * * * *